(12) United States Patent
Krishnakumar et al.

(10) Patent No.: US 6,891,821 B2
(45) Date of Patent: May 10, 2005

(54) SELF-ALIGNING BACKHAUL SYSTEM, METHOD AND APPARATUS

(75) Inventors: Anjur Sundaresan Krishnakumar, Rocky Hill, NJ (US); Kevin Alan Shelby, Marietta, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 840 days.

(21) Appl. No.: 09/746,977

(22) Filed: Dec. 20, 2000

(65) Prior Publication Data

US 2002/0075835 A1 Jun. 20, 2002

(51) Int. Cl.[7] .............................. H04Q 7/00; H04J 1/00
(52) U.S. Cl. ...................................... 370/343; 370/338
(58) Field of Search .................................. 370/310, 319, 370/322, 326, 328, 329–348, 431–463, 477, 230, 248, 254, 310.1, 310.2, 324, 395.1, 395.53, 400.3, 465, 473; 455/422, 450.2, 454.5

(56) References Cited

U.S. PATENT DOCUMENTS

2001/0024434 A1 * 9/2001 Ayyagari et al. ............ 370/347
2004/0005878 A1 * 1/2004 Olin et al. ................ 455/414.1

OTHER PUBLICATIONS

Sobrinho, Joao L. and Krishnakumar, A.S.; "Real–Time Traffic over the IEEE 802.11 Medium Access Control Layer"; Journal Article; Autumn 1996; pp. 172–187; Bell Labs Technical Journal; USA.

* cited by examiner

Primary Examiner—David Vincent

(57) ABSTRACT

The present invention enables APs to communicate with CNs in a backhaul network configuration in such a manner that the network is dynamically and adaptively self-aligning in terms of bandwidth utilization. A technique known as Black bursts is adapted to a backhaul network configuration to enable access instants in communicating between APs and CNs to be automatically and dynamically self re-aligned in response to APs entering and leaving the network. Thus, APs are not required to explicitly inform each other of these changes. Real-time APs are given priority over non-real-time APs in order to ensure that real-time traffic meets bounded end-to-end delay requirements. This is accomplished by decreasing the period of time that real-time APs must wait while the channel is idle before accessing the channel relative to the time period that non-real-time APs must wait before accessing the channel. Furthermore, the present invention utilizes the Black bursts technique to resolve contentions between APs attempting to access the channel simultaneously. During this resolution process, the AP that has been waiting the longest to access the channel is given priority. That AP then waits an additional observation time period before transmitting over the channel. When a determination is made that the observation time period has expired and that the channel is idle, the AP transmits. The observation time period is periodically decreased. This causes the APs to attempt to access the channel earlier than in previous access instants, which results in additional bandwidth being evenly spread out and consumed by the remaining APs.

27 Claims, 3 Drawing Sheets

SELF-ALIGNING BACKHAUL SYSTEM, METHOD AND APPARATUS

TECHNICAL FIELD OF THE INVENTION

The present invention relates to communications and, more particularly, to a self-aligning backhaul arrangement that enables access points to efficiently and aggressively utilize shared bandwidths when communicating with a central node (CN) comprising a point of entry into a wired network.

BACKGROUND OF THE INVENTION

Wireless local area networks (LANs) have been used for the past several years to untether data applications in the local area. In addition, wireless LANs are now being proposed for supporting real-time voice and video applications, even though the characteristics and performance requirements of data and real-time traffic differ substantially. Real-time traffic requires bounded end-to-end delays beyond which information loses its value and may be discarded. In contrast, the end-to-end delay requirements of data traffic are less stringent. The Institute of Electrical and Electronics Engineers (IEEE) formed a study group that formulated IEEE standard 802.11, which supports real-time traffic over a wireless LAN.

IEEE standard 802.11 supports real-time traffic over a wireless LAN by switching from a normal, distributed access mode to a centralized mode. The standard recommends that the medium access control (MAC) layer use a carrier sense multiple access/collision avoidance (CSMA/CA) scheme as the basic access control mechanism. This scheme is a variant of the well-known CSMA with collision detection (CSMA/CD) scheme, which is used in hard-wired LANs and which has now been adapted to meet the constraints of the wireless environment. The CSMA/CD scheme has long been recognized as unsuitable for supporting real-time applications.

Supporting real-time traffic is likely to be even more problematic in wireless LANs. Current wireless LANs typically operate at 2 Mb/s, whereas hard-wired LANs that use CSMA/CD typically operate at 10 Mb/s. Therefore, for the same relative loads, wireless LANs have higher queuing delays. For comparable system parameters, the CSMA/CA protocol has even worse throughput-delay characteristics than the CSMA/CD protocol.

While different segments of a hard-wired LAN generally are electromagnetically isolated, neighboring cells of a wireless LAN often interfere with each other, thereby decreasing the individual throughputs of the cells. Moreover, the most effective solutions for providing priority to real-time traffic in CSMA/CD-based LANs rely on the collision detection ability of hard-wired transceivers, which are not utilized in wireless communications. In an effort to provide a more suitable solution for supporting real-time traffic than the CSMA/CA protocol, the MAC layer of the IEEE 802.11 provides for an optional centralized access mode that is based on polling rather than carrier detection. However, the use of this centralized scheme imposes heavy constraints on the operation of wireless LANs. First of all, the centralized mode cannot be operated simultaneously in neighboring cells. Secondly, the centralized mode requires the existence of an access point (AP) with specialized access functions. In addition, it has been determined that the centralized scheme of the IEEE 802.11 standard results in poor performance.

In an article entitled "Real-Time Traffic Over the IEEE 802.11 Medium Access Control Layer," by Sobrinho and Krishnakumar, a modification to the IEEE 802.11 standard is discussed that guarantees bounded access delays to real-time traffic and which does not rely on collision detection capability. The real-time access points (APs) provide real-time traffic with priority over the data APs to ensure that real-time traffic is provided with a guaranteed bandwidth. The medium access control protocol discussed in the article is intended to govern communication between APs and wireless devices such as, for example, cellular telephones and laptop computers. Real-time traffic is communicated to real-time APs and data is communicated to data APs. The APs then communicate the real-time information and data to the CN serving the APs.

The MAC layer proposed in the aforementioned article utilizes a technique known as Black bursts to enable real-time APs to organize themselves in such a way that each accesses the channel between the wireless devices and the APs at regularly-spaced and distinct time intervals with minimal disruption to surrounding data traffic. As APs enter and leave the network, the Black bursts technique provides the mechanism by which access instants are re-aligned to accommodate the change in traffic patterns while preserving the basic rules for fair medium access.

It would be advantageous to provide a medium access control protocol that would provide similar advantages for communications between APs and CNs in a backhaul network configuration. In a typical backhaul configuration, the CNs comprising points of entry into a wired network collect data and/or real-time information from the APs that they serve and then the data and/or real-time information is transported, or backhauled, over a wired link, such as an optical fiber trunk. It would be advantageous to adapt the Black bursts technique to a backhaul network configuration to enable access instants in communicating between APs and CNs to be re-aligned in response to changes in the network (e.g., APs entering and leaving the network) without requiring the APs to explicitly inform each other of the changes. This is an especially desirable capability in the quest to enable wireless networks to become entirely self-configuring. The present invention meets these and other objectives.

SUMMARY OF THE INVENTION

The present invention provides a medium access control protocol that enables APs to communicate with CNs in a backhaul network configuration in such a manner that the network is dynamically self-aligning in terms of bandwidth utilization. In a typical backhaul configuration, the CNs collect data and/or real-time information from the APs that they serve and then the data and/or real-time information is transported, or backhauled, over a wired link, such as an optical fiber trunk. In accordance with the present invention, a technique known as Black bursts is adapted to a backhaul network configuration to enable access instants in communicating between APs and CNs to be automatically and dynamically re-aligned in response to changes in the network (e.g., APs entering and leaving the network) without requiring the APs to explicitly inform each other of the changes.

In accordance with the preferred embodiment of the present invention, real-time APs are given priority over non-real-time APs in order to ensure that real-time traffic meets bounded end-to-end delay requirements. This is accomplished in the aforementioned manner by decreasing the period of time that real-time APs must wait while the channel is idle before accessing the channel between the APs and the CN to a time period that is less than the time period that non-real-time APs must wait before accessing the channel. Furthermore, the present invention utilizes the Black bursts technique to resolve contentions between APs attempting to access the channel simultaneously.

During this resolution process, the AP that has been waiting the longest to access the channel between the APs and the CN is allowed to access the channel before all other APs. The AP that is first in line to access the network must then wait an additional observation time period before transmitting over the channel. When a determination is made that the observation time period has expired and that the channel is idle, the AP is allowed to transmit to the CN. In accordance with the preferred embodiment of the present invention, the observation time period is periodically decreased to cause the APs to attempt to access the channel earlier than in previous access instants. Thus, if an AP goes off line, the resulting additional bandwidth will be evenly spread out and be consumed by the remaining APs.

The present invention applies to (1) situations where all of the APs communicating with a particular CN are non-real-time (e.g., data) APs, (2) situations where one or more APs are real-time (e.g., voice and video) APs and one or more APs are non-real-time APs, and (3) situations where all APs are real-time APs. In all of these situations, the network is capable of automatically and adaptively re-aligning itself to efficiently and aggressively consume the available bandwidth. In situation 2, not only is the network capable of automatically and adaptively re-aligning itself to efficiently and aggressively consume the available bandwidth, but real-time APs are given priority over non-real-time APs so that a guaranteed QoS (Quality of Service) is realized for real-time traffic.

These and other features and advantages of the present invention will become apparent from the following description, drawings and claims.

DETAILED DESCRIPTION OF THE INVENTION

Figure 1:
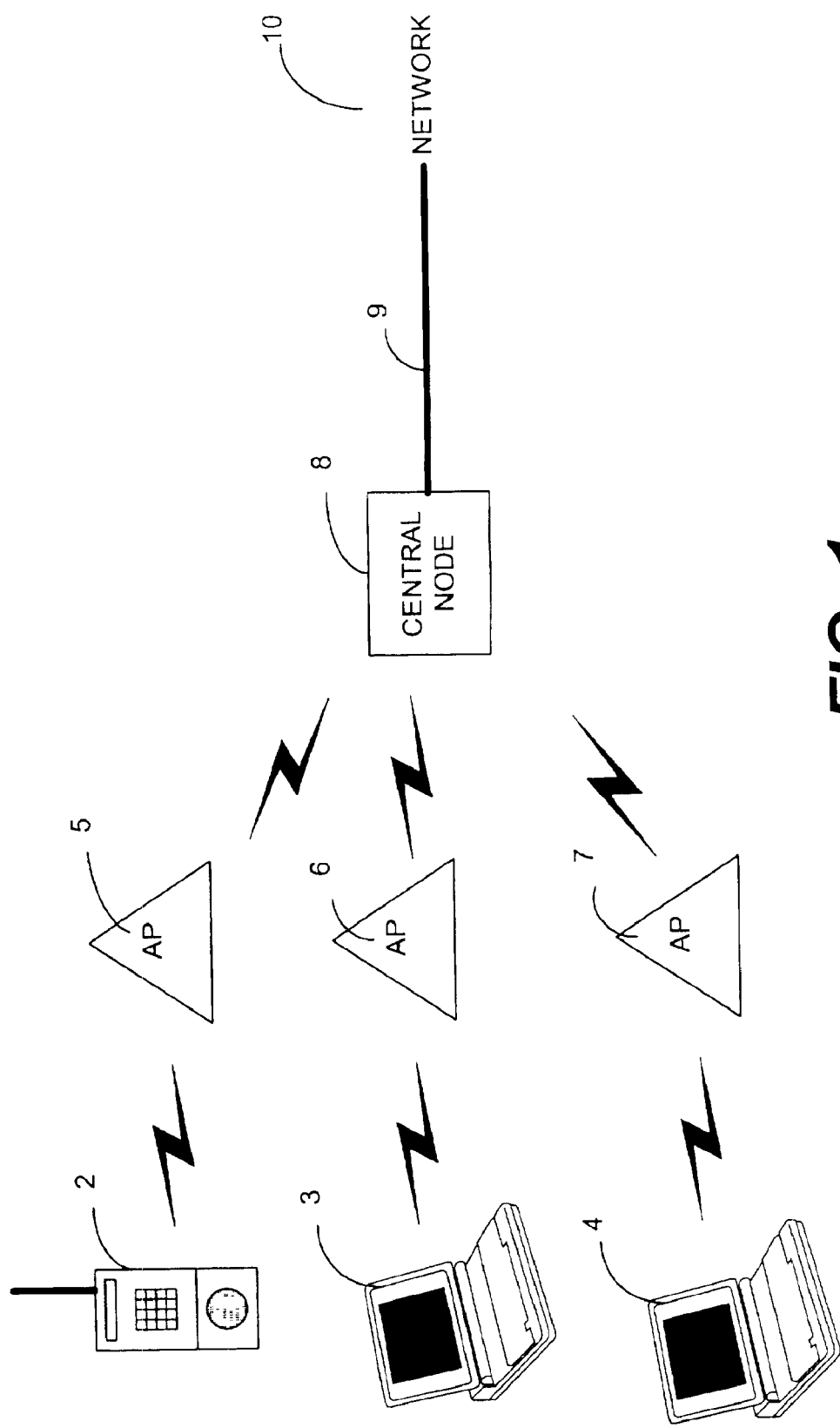
FIG. 1 is a diagram of a wireless network in which wireless devices communicate with APs which, in turn, communicate with a CN.

FIG. 1 is a diagram illustrating a wireless network 1 in which wireless devices 2, 3 and 4 communicate with APs 5, 6 and 7, which, in turn, communicate with a CN 8. The information communicated by the APs 5, 6 and 7 is then backhauled over a wired link 9 from the CN 8 to a network 10, or group of networks, for transmission to an intended destination. For exemplary purposes, it will be assumed that the wireless device 2 is a cellular telephone that communicates real-time voice information to AP 5 and that wireless devices 3 and 4 are laptop computers that transmit data to APs 6 and 7, respectively. Therefore, AP 5 will be assumed to be a real-time station whereas APs 6 and 7 will be assumed to be non-real-time, or data, station. Of course, in reality, the APs could be configured to handle both real-time and non-real-time information.

Real-time information, such as voice and video, requires time-bounded delays when being transmitted over a network. Therefore, in order to guarantee a particular quality of service (QoS) for real-time information, real-time APs must access a shared channel in such a way that the real-time information is time bounded. As stated above, the aforementioned article proposes a medium access control (MAC) protocol that provides real-time APs with priority over data APs in order to guarantee time bounded delays to the real-time traffic without disrupting the data traffic. The MAC protocol proposed in the article utilizes the Black bursts technique overlaid on the IEEE 802.11 standard in order to provide the real-time APs with priority over the non-real-time APs. As stated above, the MAC protocol proposed in the aforementioned article was directed to communications between wireless devices and APs, such as between wireless devices 2, 3 and 4, and APs 5, 6 and 7.

In contrast, the MAC protocol of the present invention is directed to communications between APs and a CN, such as between APs 5, 6 and 7 and a CN 8. Furthermore, the MAC protocol of the present invention applies equally to situations where all of the APs are non-real-time APs, or where there is a mix of real-time and non-real-time APs. In both cases, the protocol of the present invention enables the APs to efficiently utilize shared bandwidth and to be self-aligning when communicating in a backhaul network configuration with a CN. Notwithstanding these fundamental differences between the MAC protocol proposed by the article and that of the present invention, it is believed that a discussion of the MAC protocol provided by the IEEE 802.11 standard and the modification to that protocol described in the article will facilitate an understanding of the present invention. Therefore, the manner in which the MAC protocol provided by the IEEE standard operates will now be provided with reference to the state diagram of FIG. 2. The modified MAC protocol of the present invention, which utilizes the Black bursts technique will then be discussed with reference to the state diagram of FIG. 3.

Figure 2:
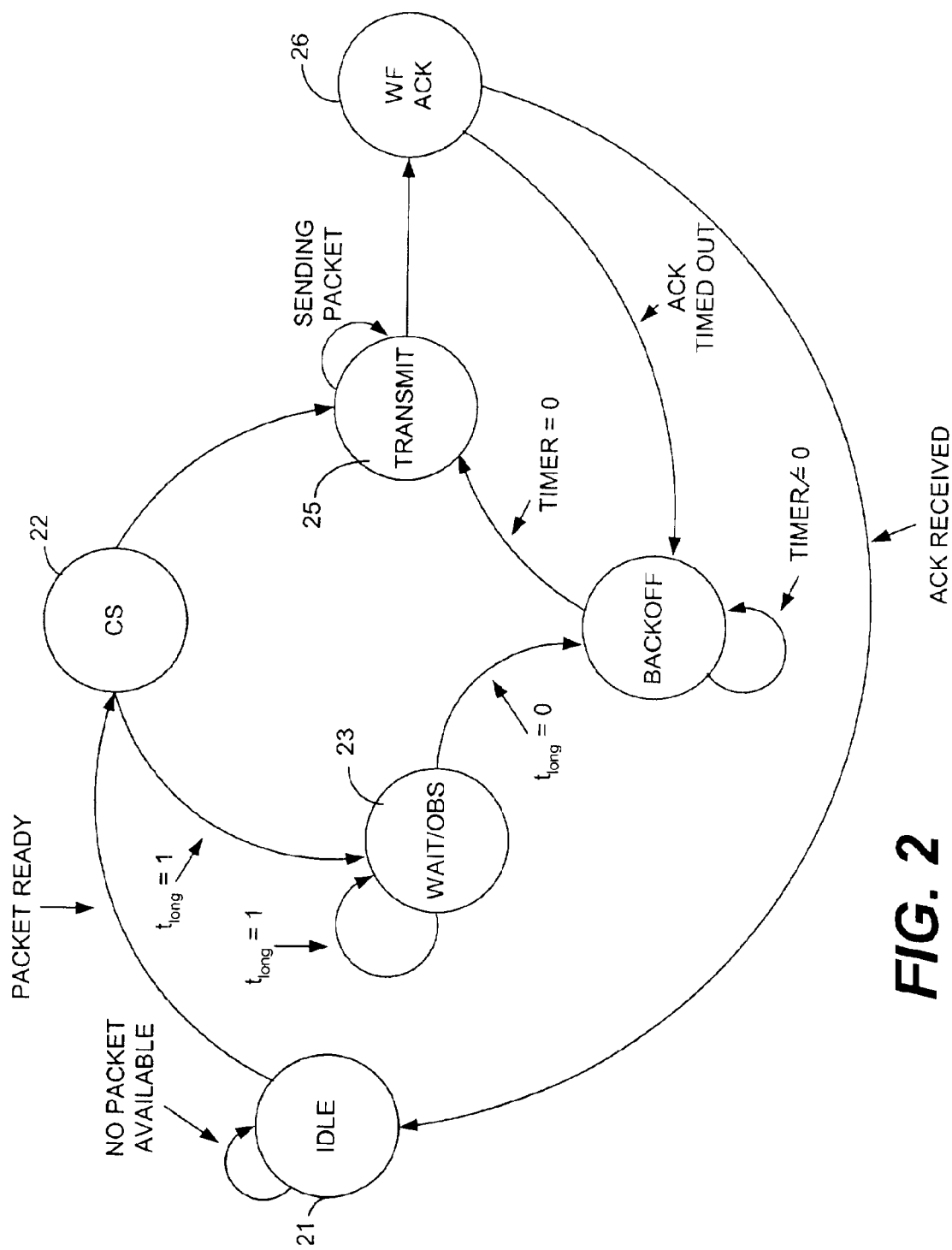
FIG. 2 is a state diagram illustrating the communications protocol provided by the IEEE 802.11 standard overlaid with the Black Bursts technique for enabling wireless devices sending real-time information to APs to have priority over wireless devices sending data to the APs over the channel between the APs and the wireless devices.

With reference to FIG. 2, a data AP, such as AP 6 shown in FIG. 1, is in the idle mode represented by state 21 until a data packet is available for transmission. Once a data packet becomes available, the AP enters the carrier sense state 22. In the carrier sense state 22, the AP monitors the channel between the AP and the wireless device to determine if the channel has been idle for a prescribed period of time, $t_{long}$. When this state 22 is initially entered by an AP, a timer is set to $t_{long}$ and the AP enters a wait state 23, during which the AP waits for the timer to expire. Once this time period expires, the AP enters a backoff state 24. The backoff state 24 prevents collisions from occurring in the event that multiple APs attempt to access the channel simultaneously. In the backoff state 24, a second timer is set to a random time period. Since the second time period is randomly selected, each AP attempting to simultaneously access the channel will have a timer set to a different time period. When this timer expires, the corresponding AP enters the transmit state 25 and utilizes the channel to communicate with the corresponding wireless device.

Once the packet has been sent, the AP enters the acknowledgement state 26, during which the AP waits for an acknowledgement indicating that the packet has been received. If the acknowledgement is not received before a time out period expires, the AP returns to the backoff state 24. From the backoff state 24, the AP will enter the transmit state 25 and re-transmit the packet once the random time period set during the backoff state 24 has expired. If the acknowledgement is received before the AP has timed out, the AP returns to the idle state 21. When the AP returns to the idle state 21, it determines whether any more packets are available for transmission. If so, the carrier sense state 22 is entered and a determination is made as to whether the channel is still idle. If the first timer has expired, the transmit state 25 will be entered and the next available packet will be sent. Therefore, once a particular AP has accessed the channel a first time, it will continue transmitting packets without entering the wait state 23 provided that proper acknowledgements are received.

In accordance with the present invention, the IEEE 802.11 standard is overlayed with the Black bursts technique and is incorporated into a backhaul configuration to provide the aforementioned benefits for communicating over a shared channel between the APs and a CN. As stated above, the present invention applies equally to the situation where all of the APs are non-real-time APs, and to the situation where there is also at least one non-real time AP. In the latter situation, the present invention provides real-time traffic with channel access priority over non-real-time traffic in order to ensure that QoS requirements are met for real-time traffic. The manner in which all of these features of the present invention are accomplished will now be described with reference to the state diagram shown in FIG. 3.

In general, the overlay utilizes a shorter waiting period for real-time APs when attempting to access the channel than for non-real-time APs in order to provide real-time traffic with priority over non-real-time traffic. This results in a guaranteed QoS for real-time traffic because it enables bounded end-to-end delay requirements for real-time traffic to be met. When a data AP (i.e., a non-real time AP) wants to access the channel between the AP and the CN, it must wait a period of time $t_{long}$ during which no carrier signal is detected before accessing the channel. In contrast, a real-time AP only waits a period of time $t_{med}$ during which no carrier signal can be detected before accessing the channel. The time period $t_{med}$ may be, for example, half as long as the time period $t_{long}$. Therefore, if a data AP and a real-time AP attempt to access the channel at the same instant in time, the real-time AP will obtain access to the channel before the data AP obtains access to the channel.

Figure 3:
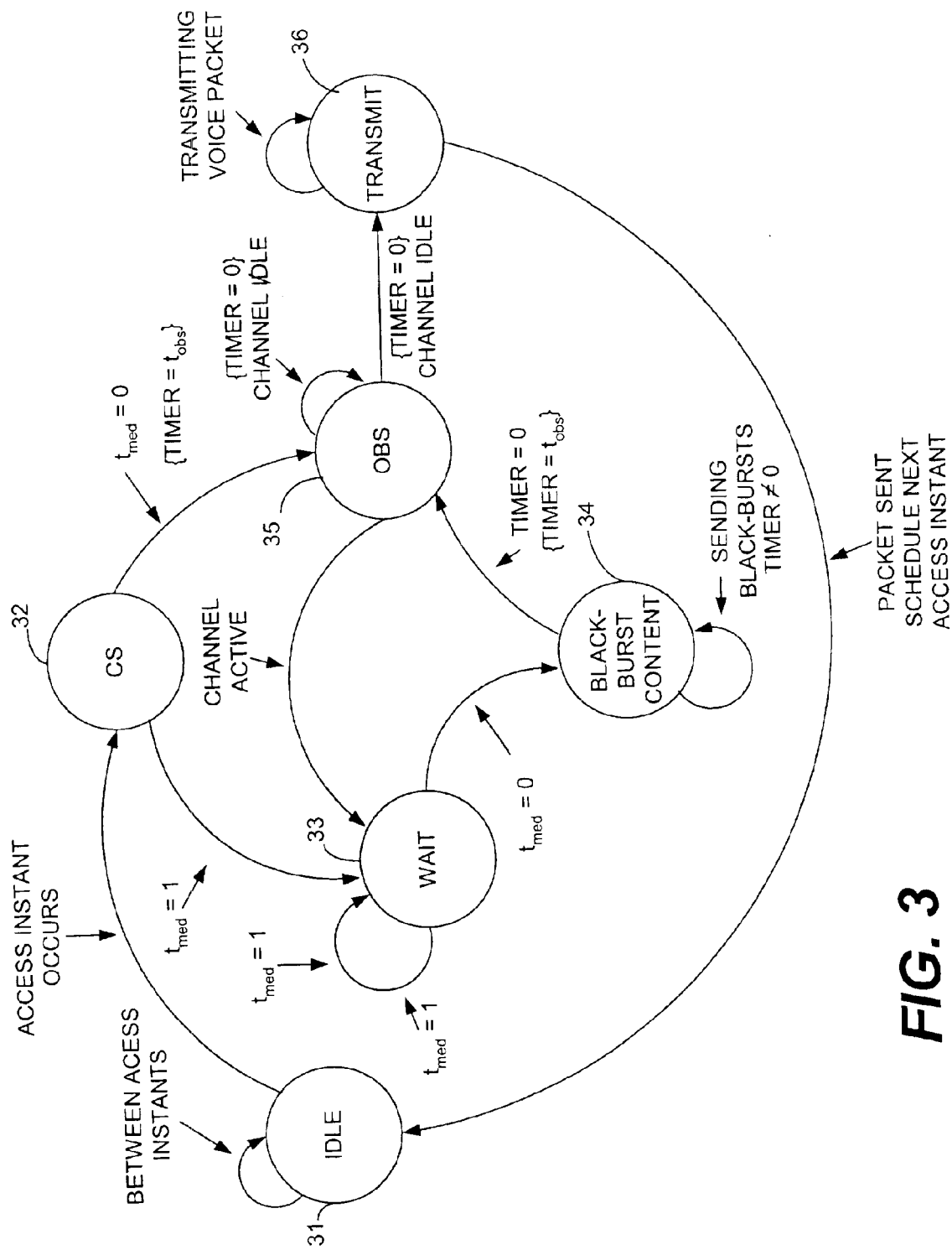
FIG. 3 is a state diagram illustrating the communications protocol of the present invention wherein the Black Bursts technique has been adapted for implementation in a backhaul network configuration to enable APs to efficiently and aggressively utilize a shared communications channel when communicating with a CN.

Rather than using the back off state 24 shown in FIG. 2, the MAC protocol of the present invention demonstrated by FIG. 3 utilizes a Black bursts contention state to enable the real-time stations to sort themselves out and to prevent collisions. As with the state diagram of FIG. 2, the AP is in an idle state 31 until it attempts to access the channel. When an access instant occurs, the AP enters the carrier sense state 32. When the AP enters the carrier sense state for the first time for a particular access instant, a first timer is set and the AP enters a wait state 33. The first timer is set to expire at the end of a time period $t_{med}$. The AP remains in the wait state 33 until the channel has been quiet for the prescribed time period $t_{med}$.

Once the timer has expired, the AP enters the Black bursts contention state 34. The Black bursts contention state serves a similar purpose to that of the backoff state 24 shown in FIG. 2. The Black bursts contention state 34 prevents APs from simultaneously transmitting over the channel, thereby preventing collisions from occurring. Essentially, each AP keeps track of the amount of time that it has been waiting to access the channel while in the Black bursts contention state 34. Whichever AP has been waiting the longest amount of time will enter the observe state 35 and will observe the channel for an additional period of time D. If the channel is active in the observe state, the AP will return to the wait state 33 and then will re-enter the Black bursts contention state 34 if/when the time period $t_{med}$ has expired. If the channel is idle when the AP is in the observe state 35 and a timer set to the time period D has expired, the AP will enter the transmit state 36 and the packet will be transmitted. If the timer set to the time period D has not expired, and the channel is idle, the AP will remain in the observe state 35 until either it determines that the channel is active or the timer expires.

Once that AP has finished transmitting, the AP will return to the idle state 31 and the next access instant will be scheduled. Then, the AP that has been waiting the next longest period of time will burst, and so on. In this way, the APs automatically sort themselves out and align themselves in an efficient time division multiplexing (TDM) arrangement at regularly-spaced intervals, while also providing the real-time APs with priority over the non-real-time APs.

In accordance with the present invention, it has been determined that the manner in which the APs access the channel in a backhaul network configuration can be improved by varying the observation period D during which any given AP observes the channel to determine whether the channel is idle and thus that the AP can transmit. In accordance with the preferred embodiment of the present invention, the time period D will periodically be decreased, thereby causing the AP to attempt to access the channel at an earlier time than in the previous access instant. Therefore, if an AP drops out (i.e., is taken off line), the additional bandwidth resulting from the AP dropping out will ultimately be evenly spread out among, and consumed by, the remaining APs. However, if the number of APs attempting to access the channel has not changed, the AP attempting earlier access to the channel will determine that the channel is active and will return to the wait and Black bursts contention states 33 and 34, respectively. The time period D will then be reset to the previous time period. Therefore, no harm is done in attempting to access the channel at an earlier time.

With reference once again to FIG. 1, the APs 5, 6 and 7 and the CN 8 will be configured with intelligence to perform the tasks required by the MAC protocol of the present invention. Preferably, each AP comprises a state machine that is configured to perform the tasks of the present invention discussed above with reference to FIG. 3. Similarly, each CN preferably comprises a state machine that is configured to cause it to send appropriate responses and control signals to the APs. Those skilled in the art will understand the manner in which hardware, software or a combination of hardware and software can be configured to perform the functions represented by the state diagram of FIG. 3 and discussed above. Any such software may be stored on a suitable computer-readable medium, such as, for example, a magnetic storage medium, an optical storage medium or a solid state storage medium.

It should also be noted that the MAC protocol of the present invention is not limited to providing real-time APs with priority over non-real-time APs. The observation period could also be varied in situations where only real-time APs are accessing the channel in the backhaul network configuration. In this case, periodically attempting to access the channel earlier will enable the real-time APs to aggressively and efficiently utilize the additional bandwidth resulting when another real-time AP goes off line. Therefore, the present invention can be utilized advantageously in situations in which (1) real-time and non-real-time APs are sharing the channel, (2) only real-time APs are sharing the channel, and (3) only non-real-time APs are sharing the channel. In all of these situations, the network is capable of automatically and adaptively re-aligning itself to efficiently and aggressively consume the available bandwidth. In situation 1, not only is the network capable of automatically and adaptively re-aligning itself to efficiently and aggressively consume the available bandwidth, but real-time APs are given priority over non-real-time APs so that a guaranteed QoS is realized for real-time traffic.

In the first case, the present invention provides an efficient, self-aligning backhaul network configuration in which real-time APs are guaranteed a particular QoS because the are given priority over the non-real-time APs to enable them to meet bounded end-to-end delay requirements for real-time traffic. In the second case, the present invention provides an efficient, self-aligning backhaul network configuration that enables non-real time APs to aggressively utilize extra bandwidth resulting when another non-real-time AP goes off line.

The present invention has been described with reference to particular embodiments, but is not limited to these embodiments. Those skilled in the art will understand that the present invention is not limited to these particular embodiments. It will also be understood by those skilled in the art that modifications may be made to the embodiments described above that are within the scope of the present invention.

What is claimed is:

1. An apparatus for controlling access to a shared channel, the shared channel being accessed by a plurality of access point (AP) stations in order to communicate wirelessly with a central node (CN) serving the AP stations (APs), the CN corresponding to a point of entry into a wired network, wherein the AP and the CN comprise, respectively, AP logic and CN logic that enable access instants in communicating between the APs and CNs to be automatically re-aligned in response to changes in bandwidth utilization in the network without requiring that any AP inform any other AP of the changes in the network.

2. The apparatus of claim 1, wherein the AP logic includes first logic for determining whether the channel has been idle for a first period of time t1, wherein when the first logic determines that the channel has been idle for the first period of time t1, the first logic causes the apparatus to enter a contention state during which a first one of said AP stations determines whether or not said first one of said AP stations has been waiting longer than any other of said AP stations to access the channel, wherein if the first logic determines that the first one of said AP stations has been waiting longer than any other of said AP stations to access the channel, the first logic causes said apparatus to enter an observation state.

3. The apparatus of claim 2, wherein the AP logic further includes second logic, wherein during said observation state, said second logic determines whether or not an observation period t2 has expired and whether or not the channel is idle, wherein if said second logic determines that the observation period t2 has expired and that the channel is idle, the second logic causes said apparatus to enter a transmit state during which said apparatus causes said first one of said AP stations to transmit a packet over the channel.

4. The apparatus of claims 3, wherein the AP logic further includes third logic, wherein said third logic is capable of varying the observation period t2 to enable one or more of said AP stations to attempt to access the channel at varying frequencies.

5. The apparatus of claim 4, wherein at least two of the AP stations are real-time AP stations and wherein at least one of the AP stations is a non-real-time AP station, said first one of said AP stations being a non-real-time AP station, the real-time AP stations having priority channel access over the non-real time AP station, the AP logic further including fourth logic, the fourth logic determining whether the channel has been idle for a third period of time t3, wherein when the fourth logic determines that the channel has been idle for the third period of time t3, the fourth logic causes the apparatus to enter said contention state during which a first one of said real-time AP stations determines whether or not said first one of said real-time AP stations has been waiting longer than any other real-time AP station to access the channel, wherein if the fourth logic determines that the first one of said real-time AP stations has been waiting longer than any other real-time AP station to access the channel, the fourth logic causes said apparatus to enter said observation state, and wherein t3 is less than t1.

6. The apparatus of claim 4, wherein said first, second and third logic are comprised in a state machine, the state machine being hardware having one or more timers for selling the first time period t1 and the observation period t2.

7. The apparatus of claims 4, wherein said first, second and third logic are comprised as a combination of hardware and software, the hardware being a computer, the computer being programmed with the software to enable the computer to perform functions associated with the first, second and third logic.

8. An apparatus for controlling access to a shared channel, the shared channel being accessed by a plurality of access point (AP) stations in order to communicate with a central node (CN) serving the AP stations, the CN corresponding to a point of entry into a wired network, the apparatus comprising first logic, the first logic determining whether the channel has been idle for a first period of time t1, wherein when the first logic determines that the channel has been idle for the first period of time t1, the first logic causes the apparatus to enter a contention state during which a first one of said AP stations determines whether or not said first one of said AP stations has been waiting longer than any other of said AP stations to access the channel, wherein if the first logic determines that the first one of said AP stations has been waiting longer than any other of said AP stations to access the channel, the first logic causes said apparatus to enter an observation state;

second logic, wherein during said observation state, said second logic determines whether or not an observation period t2 has expired and whether or not the channel is idle, wherein if said second logic determines that the observation period t2 has expired and that the channel is idle, the second logic causes said apparatus to enter a transmit state during which said apparatus causes said first one of said AP stations to transmit a packet over the channel; and third logic, wherein said third logic is capable of varying the observation period t2 to enable one or more of said AP stations to attempt to access the channel at varying frequencies.

9. The apparatus of claim 8, wherein said first, second and third logic are comprised in a state machine, the state machine being hardware having one or more timers for setting the first time period t1 and the observation period t2.

10. The apparatus of claim 8, wherein said first, second and third logic are comprised as a combination of hardware and software, the hardware being a computer, the computer being programmed with the software to enable the computer to perform functions associated with the first, second and third logic.

11. The apparatus of claim 8, wherein at least two of the AP stations are real-time AP stations and wherein at least one of the AP stations is a non-real-time AP station, said first one of said AP stations being a non-real-time AP station, the apparatus further comprising:

fourth logic, the fourth logic determining whether the channel has been idle for a third period of time t3, wherein when the fourth logic determines that the channel has been idle for the third period of time t3, the fourth logic causes the apparatus to enter said contention state during which a first one of said real-time AP stations determines whether or not said first one of said real-time AP stations has been waiting longer than any other real-time AP station to access the channel, wherein if the fourth logic determines that the first one of said real-time AP stations has been waiting longer than any other real-time AP station to access the channel, the fourth logic causes said apparatus to enter said observation state, and wherein t3 is less than t1, and wherein the real-time AP stations are given channel access priority over non-real-time AP stations.

12. The apparatus of claim 8, wherein said apparatus is utilized in a backhaul network configuration, and wherein said third logic periodically shortens the observation period t2 to cause at least one of said AP stations to access the channel at increased frequency.

13. The apparatus of claim 8, wherein all of the AP stations are non-real-time AP stations.

14. The apparatus of claim 8, wherein said apparatus is utilized in a backhaul network configuration, and wherein said third logic periodically shortens the observation period t2 to cause at least one of said AP stations to access the channel at increased frequency.

15. The apparatus of claim 8, wherein all of the AP stations are non-real-time AP stations.

16. An apparatus for controlling access to a shared channel, the shared channel being accessed by a plurality of access point (AP) stations in order to communicate with a central node (CN) serving the AP stations, the apparatus comprising:

first means for determining whether the channel has been idle for a first period of time t1, wherein when the first means determines that the channel has been idle for the first period of time t1, the first means causes the apparatus to enter a contention state during which a first one of said AP stations determines whether or not said first one of said AP stations has been waiting longer than any other of said AP stations to access the channel, wherein if the first means determines that the first one of said AP stations has been waiting longer than any other of said AP stations to access the channel, the first means causes said apparatus to enter an observation state;

second means, wherein during said observation state, said second means determines whether or not an observation period t2 has expired and whether or not the channel is idle, wherein if said second means determines that the observation period t2 has expired and that the channel is idle, the second means causes said apparatus to enter a transmit state during which said apparatus causes said first one of said AP stations to transmit a packet over the channel; and third means, wherein said third means is capable of varying the observation period t2 to enable one or more of said AP stations to attempt to access the channel at varying frequencies.

17. The apparatus of claim 16, wherein said first, second and third means are comprised in a state machine having one or more timers for setting the first time period t1 and the observation period t2.

18. The apparatus of claim 16, wherein said first, second and third means are comprised as a combination of hardware and software, the hardware being a computer, the computer being programmed with the software to enable the computer to perform functions associated with the first, second and third means.

19. The apparatus of claim 16, wherein at least two of the AP stations are real-time AP stations and wherein at least one of the AP stations is a non-real-time AP station, said first one of said AP stations being a non-real-time AP station, the apparatus further comprising:

fourth means, the fourth means determining whether the channel has been idle for a third period of time t3, wherein when the fourth means determines that the channel has been idle for the third period of time t3, the fourth means causes the apparatus to enter said contention state during which a first one of said real-time AP stations determines whether or not said first one of said real-time AP stations has been waiting longer than any other real-time AP station to access the channel, wherein if the fourth means determines that the first one of said real-time AP stations has been waiting longer than any other real-time AP station to access the channel, the fourth means causes said apparatus to enter said observation state, and wherein t3 is less than t1.

20. The apparatus of claim 16, wherein said apparatus is utilized in a backhaul network configuration, and wherein said third means periodically shortens the observation period t2 to cause at least one of said AP stations to attempt to access the channel at increased frequency.

21. The apparatus of claim 16, wherein all of the AP stations are non-real-time AP stations.

22. A method for controlling access to a shared channel, the shared channel being accessed by a plurality of access point (AP) stations in order to communicate with a central node (CN) serving the AP stations, the CN corresponding to a point of entry into a wired network, the method comprising the steps of:

determining whether the channel has been idle for a first period of time t1, wherein when a determination is made that the channel has been idle for the first period of time t1, a first one of said AP stations determines whether or not said first one of said AP stations has been waiting longer than any other of said AP stations to access the channel;

wherein if a determination is made that the first one of said AP stations has been waiting longer than any other of said AP stations to access the channel, determining whether or not an observation period t2 has expired and whether or not the channel is idle, wherein if a determination is made that the observation period t2 has expired and that the channel is idle, causing said first one of said AP stations to transmit a packet over the channel; and periodically varying the observation period t2 to cause one or more of said AP stations to attempt to access the channel at varying frequencies.

23. The method of claim 22, wherein at least two of the AP stations are real-time AP stations and wherein at least one of the AP stations is a non-real-time AP station, said first one of said AP stations being a non-real-time AP station, the method further comprising the steps of:

determining whether the channel has been idle for a third period of time t3, t3 being less than t1, wherein when a determination is made that the channel has been idle for the third period of time t3, a first one of said real-time AP stations determines whether or not said first one of said real-time AP stations has been waiting longer than any other real-time AP station to access the channel, wherein if a determination is made that the first one of said real-time AP stations has been waiting longer than any other real-time AP station to access the channel, the determination is made as to whether or not the observation period t2 has expired.

24. The method of claim 22, wherein all of the AP stations are non-real-time AP stations.

25. A computer program for controlling access to a shared channel, the shared channel being accessed by a plurality of access point (AP) stations in order to communicate with a central node (CN) serving the AP stations, the computer program being embodied on a computer-readable medium, the program comprising:

a first code segment, the first code segment determining whether the channel has been idle for a first period of time t1;

a second code segment, wherein when a determination is made that the channel has been idle for the first period of time t1, the second code segment determines whether a first one of said AP stations has been waiting longer than any other of said AP stations to access the channel;

a third code segment, wherein if a determination is made that the first one of said AP stations has been waiting longer than any other of said AP stations to access the channel, the third code segment determines whether or not an observation period t2 has expired and whether or not the channel is idle;

a fourth code segment, wherein if a determination is made that the observation period t2 has expired and that the channel is idle, the fourth code segment causes said first one of said AP stations to transmit a packet over the channel; and a fifth code segment, the fifth code segment periodically varying the observation period t2 to cause one or more of said AP stations to attempt to access the channel at varying frequencies.

26. The computer program of claim 25, wherein at least two of the AP stations are real-time AP stations and wherein at least one of the AP stations is a non-real-time AP station, said first one of said AP stations being a non-real-time AP station, the computer program further comprising:

a sixth code segment, the sixth code segment determining whether the channel has been idle for a third period of time t3, t3 being less than t1;

a seventh code segment, wherein when a determination is made that the channel has been idle for the third period of time t3, the seventh code segment determines whether or not a first one of said real-time AP stations has been waiting longer than any other real-time AP station to access the channel, wherein if a determination is made that the first one of said real-time AP stations has been waiting longer than any other real-time AP station to access the channel, the determination is made by the third code segment as to whether or not the observation period t2 has expired.

27. The computer program of claim 25, wherein all of the AP stations are non-real-time AP stations.

\* \* \* \* \*